United States Patent Office 3,567,690
Patented Mar. 2, 1971

3,567,690
COPOLYMERS HAVING PREVAILING POLYOXY-METHYLENE STRUCTURE, PRODUCTS DERIVED THEREFROM, AND PROCESSES FOR PRODUCING SAID COPOLYMERS
Gianfranco Pregaglia, Milan, Paolo Roffia, Mantova, and Valentino Zamboni, Arsizio, Italy, assignors to Montecatini Edison S.p.A., Milan, Italy
No Drawing. Filed Feb. 24, 1967, Ser. No. 618,349
Claims priority, application Italy, Feb. 25, 1966, 4,330/66
Int. Cl. C08g 1/18, 11/00
U.S. Cl. 260—73                                              12 Claims

ABSTRACT OF THE DISCLOSURE

Preparation of new polyoxymethylene copolymers consisting of at least 95% of oxymethylene units separated by oxyalkylenic units bound to side groups containing double bonds; these products have a low viscosity in the molten state since practically no cross-linking occurs during the reaction of copolymerization. A controlled cross-linking of the copolymers is then carried out through the olefinic double bond present therein to obtain products with increased viscosity in the molten state or having the characteristics of a thermosetting resin.

BACKGROUND OF THE INVENTION (1) Field of the invention

This invention relates to new copolymers having prevailingly oxymethylenic structure consisting of at least 95% of —$CH_2$—O— units that form sequences of oxymethylenic units separated by oxyalkylenic units bound to side groups containing olefinic double bonds; through these double bonds the copolymers can be reacted with various substances for modification of the properties thereof; and to a process for producing the new copolymers.

(2) Description of the prior art

Copolymers of trioxane with cyclic ethers and acetals, such as ethylene oxide, dioxolane and methadioxane prepared under given conditions are known in the prior art.

It is known, also, that, under the same conditions, compounds containing active double bonds, such as styrene, vinyl ethers, isobutenes, and indenes will form copolymers with trioxane.

The copolymers mentioned are thermally stable due to the presence of sequences of two or more adjacent carbon atoms in the polyoxymethylenic chains.

It is also known to be possible to copolymerize trioxane with bifunctional compounds such as diepoxides, cyclic diformals or epoxy-formals, thus obtaining copolymers modified by the presence of transverse bonds between the polymeric chains and derived from the opening of both of the cyclic ether groups in the bifunctional comonomers. However, the degree of cross-linking which can be obtained by this technique must of necessity be limited if the viscosity of the molten copolymer is to be such that the copolymers can be processed without excessive difficulty. In practice, the required limited cross-linking is achieved by limiting the proportion of polymerized units of the bifunctional comonomer to a few percent of the total units making up the copolymeric macromolecular main chain and including, in the starting monomers mixture, a monofunctional comonomer which assists in rendering the final copolymer thermally stable.

SUMMARY OF THE INVENTION

It has now surprisingly been found that it is possible to obtain copolymers of trioxane with comonomers containing two polymerizable groups of which practically only the groups of one type participate in the copolymerization reaction, and which are essentially free of crosslinks and have low viscosities in the molten state.

One object of this invention is to provide new copolymers of trioxane with comonomers containing two polymerizable groups of which only the groups of one type react during the copolymerization and which copolymers consist essentially of macromolecules having prevailingly polyoxymethylenic structure and containing statistically distributed sequences of two adjacent carbon atoms bound to side groups containing olefinic double bonds.

Another object of the invention is to provide a process for producing the new copolymers.

These and other objects are accomplished, in accordance with this invention, by copolymerizing trioxane with esters having the general formula:

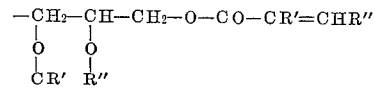

wherein R′ and R″ represent hydrogen atoms or methyl groups, in an ester amount from 0.2 to 15 mols per 100 mols of trioxane.

Comonomers having the formula given and used in practicing this invention include, for example, 4-hydroxymethyl-1,3-dioxolane acrylate and methacrylate; 4-hydroxymethyl-2,2-dimethyl - 1,3 - dioxolane acrylate and methacrylate.

In accordance with the invention, the copolymerization is carried out by contacting the comonomers with catalysts of the Lewis acid type containing chlorine or fluorine, at temperatures between 30° C. and 120° C., preferably between 50° C. and 90° C.

In the copolymers of the invention, the ratio of polymerized oxymethylene units to polymerized units of the ester comonomer is between 20:1 and 1500:1, preferably between 60:1 and 300:1.

Such copolymers, which consist of oxymethylenic sequences separated by oxyalkylenic units bound to side groups containing double bonds and deriving from the opening of an acetalic bond of the ester comonomer during the copolymerization, are characterized by low viscosities in the molten state, a characteristic which practically excludes the possibility that cross-linking has occurred during the copolymerization reaction.

The essential absence of crosslinks from the copolymers is surprising. It indicates that the olefinic double bonds have, at most, only a low reactivity under the conditions of the copolymerization. Such poor reactivity (or relative inertness) of the olefinic double bonds cannot be explained on the basis of readily apparent theoretical considerations.

Similarly to copolymers of trioxane with monofunctional comonomers, the new copolymers have low viscosity in the molten state, are thermally stable, and have a low content of unstable fraction.

However, the present copolymers are markedly different from prior art copolymers in that the side groups containing double bonds which are bound to the oxyalkylenic units separating the oxymethylenic sequences have the effect of rendering the present copolymers reactive to various modifying agents which alter the properties of the copolymers.

For example, due to the presence in these copolymers of the side groups containing free olefinic double bonds, it is possible:

(1) To effect a further polymerization of the copolymers through the olefinic double bonds, by the addition of small amounts of substances which yield free radicals and by controlling the amounts of the free radical-producing substances added to the copolymers, to control the polymerization of the olefinic double bonds and thus control the extent to which the copolymers are after crosslinked, whereby there are obtained products having a controlled, increased viscosity in the molten state, or products having the typical characteristics of a thermosetting resin but which nevertheless retain most of the excellent mechanical properties of polyoxymethylenic polymers; in general, by using small amounts of crosslinking agent and a low content of unsaturated ester are obtained products having an increased viscosity in the molten state which are suitable for blow-molding, extrusion, etc., whereas thermosetting resins are obtained when using high amounts of crosslinking agent and a high content of unsaturated ester.

(2) With the aid of free-radical type catalysts, to graft onto the main copolymeric chains, polymeric chains having a structure different from the polyoxymethylenic structure.

The present invention also comprises the after-modified copolymers of trioxane and the polymerizable esters.

The free radicals used for modifying the copolymers can be provided, in practice, by mixing the new copolymers with substances which decompose under heating with the formation of radicals, such as azo compounds. These substances can be added to solutions of the copolymers in suitable solvents, thus forming insoluble gels, or can be mixed with the copolymers in the form of powders to obtain a mixture the copolymer of which is crosslinked during processing, as during extrusion or molding thereof.

Since the copolymers have prevailingly polyoxymethylenic structure, it could have been expected that the presence of free radicals during processing thereof would adversely affect the thermal stability of the copolymers. Surprisingly, the presence of the free radicals during processing of the copolymers does not impair the thermal stability of the copolymers.

Substances which supply the free radicals include azobisisobutyronitrile; azodicarbonamide; diazoamines; and all azo derivatives which decompose below 200° C.

The copolymers of the invention can also be crosslinked thermally, by heating the same in admixture with other unsaturated heat-polymerizable substances containing two or more double bonds, such as divinylbenzene, allylmethacrylate, and diallyl cyanurate.

Analogously, polymeric chains having a structure different from the prevailingly polyoxymethylenic structure of the copolymers can be grafted onto the copolymer chains thermally, by heating the copolymers in admixture with monomers polymerizable by heat, such as styrene, acrylates, vinyl acetate, etc.

The amount of the modifying substances mixed with the copolymers can vary, but is generally from 0.1% to 5% by weight, based on the copolymer weight.

The esters used as comonomers for the production of the new copolymers of this invention can be used alone or in mixtures with each other or with monofunctional comonomers such as, for instance, dioxolane; ethylene oxide; and hexahydrobenzotrioxyepane.

The amount of the esters mixed with the trioxane in the starting monomer mixture can vary and can be from 0.2 mol to 15 mols per 100 mols of trioxane. Preferably, the esters are used in an amount of from 1 mol to 5 mols per 100 mols of trioxane. Even when the esters are used in the preferred amount of from 1 to 5 mols per 100 mols of trioxane, the copolymers obtained have a molecular weight sufficiently high (inherent viscosity at least 0.5 in dimethyl formamide at 150°) for practical purposes, despite the fact the esters used belong to the class of esters known to function as transfer agents in the polymerization of trioxane.

The catalysts used to obtain the new copolymers are of the kind known as "Lewis acid," and more particularly those containing chlorine or fluorine atoms, such as antimonium chloride; antimonium fluoroborate; phosphorus pentachloride and tin tetrachloride. The preferred copolymerization catalysts are $FeCl_3$ or $BF_3$, either as such or complexed with organic compounds in which oxygen or sulfur is the electron donor, including such complexes as $BF_3 \cdot (C_2H_5)_2O$ and $BF_3 \cdot (CH_3)_2S$.

The useful amount of catalyst is from 0.0001% to 0.1%, preferably from 0.001% to 0.01%, by weight, based on the weight of the trioxane.

The trioxane must be anhydrous or substantially anhydrous.

The copolymerization is preferably carried out in the absence of solvents. However, it is possible to effect the copolymerization in hydrocarbon solvents such as benzene or cyclohexane, in chloroalkanes such as methylene chloride, or in nitro-substituted aromatic hydrocarbons such as nitrobenzene.

When the copolymers are after-crosslinked as discussed hereinabove, the modification is evidenced by a decrease in the amount of the crosslinked product which is extruded at 200° C. through an orifice having a diameter of 2.0 mm. and a length of 7.5 mm., as compared to the amount of the copolymer per se which is extruded under the same conditions and load in the same time interval (ASTM 1238–53–T).

In carrying out the tests, the extent to which the copolymers were after-crosslinked was measured by determining the ratio of the amounts in grams of copolymer extruded in a ten minute period, under loads of 10 kg. and 2.160 kg., respectively $$\left[R = \frac{MI(10)}{MI(2.160)}\right]$$

The value of said ratio, which is about 5 to 6 for linear copolymers, increases up to 10–15 for the crosslinked products and graft copolymers. The crosslinking imparts increased elasticity to the molten products, which is manifested as an increase in the cross-section of the extruded crosslinked polymer as compared to the cross-section of the extruded non-crosslinked copolymer. Moreover, the crosslinked copolymers of the invention are only slightly soluble in dimethylformamide at 150° C., the amount of insoluble gel being approximately proportional to the extent to which the copolymers are crosslinked.

The elasticity of the after-crosslinked copolymers in the molten state makes it possible to process them by techniques not normally employed in the processing of polyoxymethylenic polymers. In fact, crosslinked copolymers according to the invention and having ratios $$\frac{MI(10)}{MI(2.160)}$$

of 8–15, can be blow-molded or extruded to various shaped articles, for example tubes or sheets.

The following examples are given to illustrate the invention without limiting the same.

DESCRIPTION OF THE PREFERRED EMBODIMENTS

EXAMPLE 1

100 g. of trioxane, made anhydrous by heating to the boiling point on a sodium-potassium alloy, are distilled under nitrogen atmosphere and condensed in a 250 cc. flask provided with an agitator. To the thus purified trioxane, 4 cc. of methacrylate of 4-hydroxymethyl-1,3-dioxolane are added and the mass is heated to 70° C. until a homogeneous solution is obtained. One cc. of a 0.07 M of $BF_3 \cdot (C_2H_5)_2O$ in nitrobenzene is then added. The polymerization starts immediately and leads to the formation of a compact polymeric mass.

After ½ hour at 70° C., the polymerization is stopped by addition of a methanol excess. The polymer is finely ground, washed with a warm ammonia solution and then with acetone. After drying under a mechanical pump, 98 g. of polymer are weighed.

A sample (containing 0.5% of N-phenyl-beta-naphthylamine added as antioxidant) shows a degradation constant under vacuum at 220° C. of 0.08% per minute and an inherent viscosity of 0.51 in dimethylformamide at 150° C. The content of unsaturated groups, calculated by infrared analysis and referred to the thickness unit in mm., is equivalent to 8.7 absorbance units for the C=O groups and of 1.52 absorbance units for the —C=C— groups.

The melt index value of a sample extruded at 200° C. with a load of 2.16 kg. is 12 whereas it is 60 with a load of 10 kg.; the ratio between the fluidity indexes is 5. In order to reduce the melt index and to increase the fluidity ratio, a sample of polymer swollen with dimethylformamide at 100° C. is mixed with 0.2% by weight of azo-bis-isobutyronitrile. After washing with acetone and drying at 60° C. under vacuum, the polymer has a melt index of 0.13 under a load of 2.16 kg. and of 1.0 under a load of 10 kg. at the second passage in the rheometer, with a ratio of the indexes of about 8. The extruded material has the shape of a "spaghetto" having a diameter about twice the diameter of the extrusion orifice. It is insoluble in dimethylformamide at 150° C. in which it forms a gel.

Analogously, by mechanically homogenizing a dry sample of polymer with 1% by weight of azodicarbonamide, the melt index value is reduced to 3 with a load of 2.16 kg. and to 28 with a load of 10 kg.

Higher concentrations of crosslinking agent, added either to swollen or to dry material, result in a degree of crosslinking such that at 200° C. the polymer does not flow through the capillary of the rheometer even with very high loads although it gives a seemingly molten compact mass.

EXAMPLE 2

By operating as in Example 1, 100 g. of trioxane are copolymerized with 2 cc. of methacrylate of 4-hydroxymethyl - 1,3 - dioxolane and 3 cc. of dioxolane by means of 1 cc. of a 0.07 M solution of $BF_3 \cdot (C_2H_5)_2O$ in nitrobenzene.

The polymerization is immediate. The polymer ground, washed and dried, weighs 91 g.

A sample (containing 0.5% of added N-phenyl-beta-naphthylamine) shows a degradation constant under vacuum at 220° C. of 0.04% per minute and an inherent viscosity of 0.47 in dimethylformamide at 150° C. The content of unsaturated groups, calculated by infrared analysis and referred to the thickness unit in mm., is equivalent to 4.95 absorbance units for the C=O groups and of 0.92 absorbance unit for the —C=C— groups.

The melt index value of a sample extruded at 200° C. with a load of 2.16 kg. is 25 whereas it is 130 with a load of 10 kg. In order to reduce the melt index, a polymer sample is mixed with 2% by weight of azobisisobutyronitrile; the product has a melt index of 2.3 under a load of 2.16 kg. and of 30 under a load of 10 kg. at the second passage in the rheometer, with a ratio of the fluidity indexes of 13.

The extruded material appears to be swollen, slightly porous and isoluble in dimethylformamide at 150° C.

Analogously by mechanically homogenizing a dry sample of polymer with 2% by weight of azodicarbonamide, the melt index value is reduced to 13.5 with a load of 2.16 kg. while the value of the ratio of the fluidity index increases to values higher than 7.

A sample of polymer mixed with 16% by weight of a 50% solution of divinyl benzene in ethylvinylbenzene shows a melt index reduced to 0.7 under a load of 2.16 kg. and to 6 under a load of 10 kg. with a $$\frac{MI10}{MI2.16}$$

ratio of 8.5.

EXAMPLE 3

By operating as in Example 1, 100 g. of trioxane are copolymerized with 1.5 cc. of methacrylate of 4-hydroxymethyl-1,3-dioxolane and 3 cc. of dioxolane with the aid of 0.8 cc. of a 0.07 M solution of $BF_3 \cdot (C_2H_5)_2O$ in nitrobenzene. Polymerization occurs immediately.

The polymer ground, washed and dried, weighs 95 g.

A sample (containing 0.5% of added N-phenyl-beta-naphthylamine) shows a degradation constant under vacuum at 220° C. of 0.04% per minute and an inherent viscosity of 0.85 in dimethylformamide at 150° C. The content of unsaturated groups, calculated by infrared analysis and referred to the thickness unit in mm., is equivalent to 4.15 absorbance units for the C=O groups and 0.69 absorbance unit for the C=C groups.

The melt index value of a sample extruded at 200° C. with a load of 2.16 kg. is 14 while it is 84 with a load of 10 kg.; the ratio of the fluidity indexes is 6.1. In order to reduce the melt index and to increase the ratio of the fluidity indexes, a sample of dry copolymer is mixed and mechanically homogenized with 2% by weight of azobisisobutyronitrile; the product shows a melt index of 2 under a load of 2.16 kg. and of 26 under a load of 10 kg. at the third passage in the capillary rheometer, with a ratio of the fluidity indexes of 13. After this treatment the polymer is practically insoluble in dimethylformamide at 150° C.

EXAMPLE 4

By operating as in Example 1, 100 g. of trioxane are copolymerized with 1.5 cc. of methacrylate of 4-hydroxymethyl-2,2-dimethyl-1,3-dioxolane and 3 cc. of dioxolane by means of 1 cc. of a 0.07 M solution of $BF_3 \cdot (C_2H_5)_2O$ in nitrobenzene. The polymerization is immediate. The polymer ground, washed and dried, weighs 92 g.

A sample (containing 0.5% of added N-phenyl-beta naphthylamine) shows a degradation constant under vacuum at 220° C. of 0.05% per minute and an inherent viscosity in dimethylformamide at 150° C. of 0.5. The content of unsaturated groups, calculated by infrared analysis and referred to the thickness units in mm., is equivalent to 3.65 absorbance units for the C=O groups and 0.55 absorbance unit for the C=C groups.

The melt index value of a sample extruded at 200° C. with a load of 2.16 kg. is 50. A sample of polymer mixed with 5% by weight of a 50% solution of divinylbenzene in ethylvinylbenzene shows a melt index reduced to 2.1 under a load of 2.16 kg. and to 62 under a load of 10 kg. with a ratio $$\frac{MI10}{MI2.16} = 30$$

The product behaves during extrusion, like a remarkably elastic molten material, and is only partially soluble in dimethylformamide at 150° C.

EXAMPLE 5

By operating as in Example 1, 100 g. of trioxane are copolymerized with 2 cc. of acrylate of 4-hydroxy-methyl-1,3-dioxolane and 3 cc. of dioxolane by means of 1 cc. of a 0.07 M solution of $BF_3 \cdot (C_2H_5)_2O$ in nitrobenzene.

The polymerization is immediate. The polymer ground, washed and dried, weighs 82 g.

A sample (containing 0.5% of added N-phenyl-beta naphthylamine) shows a degradation constant under vacuum at 220° C. of 0.05% per minute and an inherent viscosity of 0.51 in dimethylformamide at 150° C. The content of unsaturated groups, calculated by infrared analysis and referred to the thickness unit in mm., is equivalent to 4.6 absorbance units for the C=O groups and to 0.90 absorbance unit for the C=C groups.

The melt index of a sample extruded at 200° C. with a load of 2.16 kg. is 22 while it is 120 with a load of 10 kg. In order to reduce the melt index a sample of polymer is mixed with 2% by weight of azobis-isobutyronitrile; the product has a melt index of 2.1 under a load of 2.16 kg. and of 27 under a load of 10 kg. at the second passage in the rheometer, with a ratio of the fluidity indexes of 12.8.

The extruded material is insoluble in dimethylformamide at 150° C.

Changes may be made in details in carrying out the invention without departing from its spirit. Therefore, we intend to include in the scope of the appended claims all modifications and variations which will be obvious to those skilled in the art from the description and working examples given herein.

What is claimed is:

1. An extrudable copolymer of trioxane and a cyclic ester-acetal selected from the group consisting of 4-hydroxymethyl - 1,3 - dioxolane acrylate; 4-hydroxymethyl-1,3-dioxolane methacrylate; 4-hydroxymethyl - 2,2 - dimethyl - 1,3 - dioxolane acrylate; and 4-hydromethyl-2,2-dimethyl-1,3-dioxolane methacrylate; said copolymer consisting of at least 95% of —$CH_2$—O— units, and essentially all of the remaining units being units of the cyclic ester-acetal resulting from the opening of an acetalic bond of the cyclic ester-acetal during the copolymerization.

2. Copolymers according to claim 1, further characterized in that the ratio of polymerized oxymethylenic units to polymerized units derived from the cyclic acetal is from 20:1 to 1500:1.

3. Copolymers according to claim 1, further characterized in that the ratio of polymerized oxymethylenic units to polymerized units derived from the cyclic acetal is from 60:1 to 300:1.

4. Copolymers according to claim 1, further characterized in also containing a minor proportion of polymerized units of a monofunctional monomer selected from the group consisting of dioxolane, ethylene oxide, and hexahydro-benzotrioxyepane.

5. The copolymers of claim 1, after-crosslinked by free radicals derived from an azo derivative which decomposes at temperatures below 200° C. with the formation of free radicals.

6. The copolymers of claim 1, after-crosslinked by free radicals derived from azobis-isobutyronitrile.

7. Process for producing copolymers according to claim 1, which process comprises contacting a mixture of trioxane and a cyclic acetal selected from the group consisting of 4-hydroxymethyl - 1,3 - dioxolane acrylate; 4-hydroxymethyl - 1,3 - dioxolane methacrylate; 4-hydroxymethyl - 2,2 - dimethyl - 1,3 - dioxolane acrylate and 4-hydroxymethyl - 2,2 - dimethyl - 1,3 - dioxolane methacrylate, containing an amount of the cyclic acetal of from 0.2 to 15 mols per 100 mols of trioxane, with a Lewis acid catalyst containing halogen selected from the group consisting of chlorine and fluorine, at a temperature from 30° C. to 120° C.

8. The process according to claim 7, further characterized in that the monomers are contacted with the catalyst at a temperature from 50° C. to 90° C.

9. The process according to claim 7, further characterized in that the amount of the cyclic acetal in the starting monomers mixture is from 1 to 5 mols per 100 mols of trioxane.

10. The process according to claim 7, further characterized in that the catalyst is selected from the group consisting of $BF_3 \cdot (C_2H_5)_2O$; $BF_3 \cdot (CH_3)_2S$; $FeCl_3$; and $SnCl_4$.

11. The process according to claim 7, further characterized in that the catalyst is used in an amount of from 0.0001% to 0.1% by weight on the trioxane weight.

12. The process according to claim 7, further characterized in that the copolymerization reaction product is mixed with a cross-linking compound which is an azo derivative having a decomposition temperature below 200° C.

References Cited
UNITED STATES PATENTS

| | | | |
|---|---|---|---|
| 3,249,654 | 5/1966 | Von Bonin et al. | 260—874 |
| 3,297,647 | 1/1967 | Schott et al. | 260—73 |
| 2,680,735 | 6/1954 | Fegley et al. | 260—86.1 |

WILLIAM H. SHORT, Primary Examiner

L. M. PHYNES, Assistant Examiner

U.S. Cl. X.R.

260—67, 885